(12) United States Patent  
Hahn et al.

(10) Patent No.: US 12,007,306 B2
(45) Date of Patent: Jun. 11, 2024

(54) METHOD FOR ASSOCIATING A LEAK DETECTOR WITH AN APPLIANCE

(71) Applicant: Haier US Appliance Solutions, Inc., Wilmington, DE (US)

(72) Inventors: Janghwan Hahn, Louisville, KY (US); Ryan James Scheckelhoff, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/829,401

(22) Filed: Jun. 1, 2022

(65) Prior Publication Data

US 2023/0393016 A1    Dec. 7, 2023

(51) Int. Cl.
*G01M 3/24* (2006.01)
*G08B 21/18* (2006.01)
*H04R 1/08* (2006.01)
*H04R 3/00* (2006.01)

(52) U.S. Cl.
CPC ............... *G01M 3/24* (2013.01); *H04R 1/08* (2013.01); *H04R 3/00* (2013.01); *G08B 21/18* (2013.01); *H04R 2420/07* (2013.01)

(58) Field of Classification Search
CPC ......... Y02E 10/50; H02S 20/10; H02S 20/20; H02S 40/30; G01M 3/202; G01M 5/0016; G01M 5/0091; G01M 3/243; G01M 3/04; G01M 3/2815; H04N 21/4394; H04N 21/44218; H04R 29/00
USPC ................................... 381/92, 56–58; 700/94
See application file for complete search history.

(56) References Cited

U.S. PATENT DOCUMENTS

| 9,159,217 | B1 | 10/2015 | Logan et al. | |
| 9,386,140 | B2 | 7/2016 | Logan et al. | |
| 9,888,452 | B2 | 2/2018 | Logan et al. | |
| 10,531,210 | B2 | 1/2020 | Lewis et al. | |
| 11,061,416 | B2 | 7/2021 | Ravid et al. | |
| 2002/0107694 | A1* | 8/2002 | Lerg | B60C 23/06 704/273 |
| 2003/0214405 | A1* | 11/2003 | Lerg | B60C 23/063 340/565 |
| 2019/0281371 | A1* | 9/2019 | Klicpera | H04Q 9/00 |
| 2020/0363283 | A1 | 11/2020 | Horne et al. | |

FOREIGN PATENT DOCUMENTS

| WO | WO 2020/181275 | * | 9/2020 | ............ H04Q 9/02 |
| WO | WO2020181275 A1 | | 9/2020 | |

* cited by examiner

*Primary Examiner* — Lun-See Lao
(74) *Attorney, Agent, or Firm* — Dority & Manning, P.A.

(57) ABSTRACT

A method for associating a leak detector with an appliance includes receiving data from a leak detector; detecting a sound signature of the appliance based at least in part on the sound signal; identifying the appliance as one of a plurality of appliance types; and associating the leak detector with the one of the plurality of appliance types.

15 Claims, 2 Drawing Sheets

METHOD FOR ASSOCIATING A LEAK DETECTOR WITH AN APPLIANCE

FIELD OF THE INVENTION

The present subject matter relates generally to appliances, and more particularly, to associating leak detectors with appliances.

BACKGROUND OF THE INVENTION

Certain appliances are connected to a water supply line and utilize water from the water supply line. For instance, dishwashers and washing machines utilize water to clean articles, refrigerators and icemakers dispenser liquid water and/or generate ice, water heaters generate hot water, etc. Leaks can develop within or nearby such appliances for a variety of reasons. For example, high pressure within the water supply line can stress appliance components, and freezing water within the appliance can expand and stress appliance components.

Leak detectors can be positioned proximate appliances to detect leaks and alert a user of such leaks. Such leak detectors can be monitored remotely. However, determining the particular appliance monitored by the leak detector can be difficult.

Accordingly, a system and method for associating a leak detector with a type of appliance would be useful.

BRIEF DESCRIPTION OF THE INVENTION

Advantages of the invention will be set forth in part in the following description, or may be apparent from the description, or may be learned through practice of the invention.

In an example embodiment, a system for associating a leak detector with an appliance includes a leak detector with a microphone configured for monitoring sound generated during operation of an appliance and a computing device is in signal communication with the leak detector. The computing device is configured for: receiving, via a wireless network with the leak detector, data corresponding to a sound signal generated by the appliance; detecting a sound signature of the appliance based at least in part on the sound signal, the sound signature corresponding to one of a plurality of appliance types; identifying the appliance as the one of the plurality of appliance types; and associating the leak detector with the one of the plurality of appliance types.

In another example embodiment, a method for associating a leak detector with an appliance includes: receiving data from a leak detector at a computing system that includes one or more computing devices via a wireless network, the data from the leak detector corresponding to a sound signal generated by an appliance received at a microphone of the leak detector; detecting, with the computing system, a sound signature of the appliance based at least in part on the sound signal, the sound signature corresponding to one of a plurality of appliance types; identifying, with the computing system, the appliance as the one of the plurality of appliance types; and associating, with the computing system, the leak detector with the one of the plurality of appliance types.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
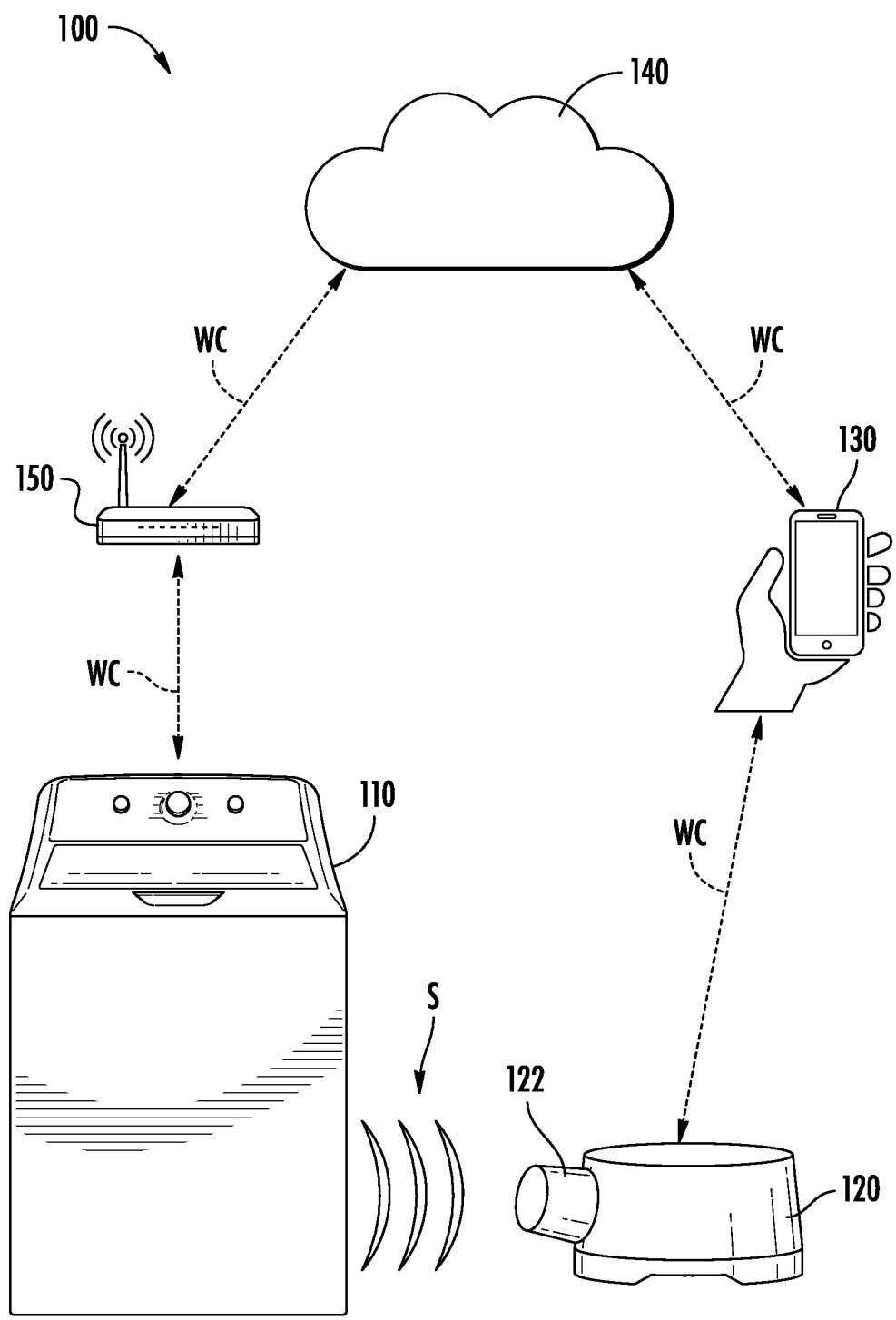
FIG. 1 is a schematic view of a leak detection system for an appliance according to an example embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent (10%) margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic view of a leak detection system 100 for an appliance 110 according to an example embodiment of the present subject matter. While appliance 110 is shown as a washing machine appliance in the illustrated example embodiment. It will be understood that appliance 110 may be any other type of water consuming appliance in alternative example embodiments. For example, appliance 110 may be a water heater appliance, a dishwasher appliance, a refrigerator appliance, an ice maker appliance, etc., in alternative example embodiments. Thus, it will be understood that leak detection system 100 is not limited to any particular type of appliance but rather may be used to detect leaks in any type of appliance.

Appliance 110 may include various components. For instance, appliance 110 may include a user interface panel (not labeled). The user interface panel may represent a general-purpose input/output ("GPIO") device or functional block. In some embodiments, the user interface panel may include one or more of a variety of digital, analog, electrical, mechanical, or electro-mechanical input devices including rotary dials, control knobs, push buttons, and touch pads. The user interface panel may include a display component, such as a digital or analog display device designed to provide operational feedback to a user.

Generally, appliance 110 may include a controller (not labeled) in operative communication with the user input device. The user interface panel of appliance 110 may be in communication with the controller via, for example, one or more signal lines or shared communication busses, and signals generated in controller operate appliance 110 in response to user input via the user input devices. Input/Output ("I/O") signals may be routed between controller and various operational components of appliance 110. Thus, operation of appliance 110 can be regulated by the controller that is operatively coupled to the user interface panel.

The controller may be a "processing device" or "controller" and may be embodied as described herein. The controller may include a memory and one or more microprocessors, microcontrollers, application-specific integrated circuits (ASICS), CPUs or the like, such as general or special purpose microprocessors operable to execute programming instructions or micro-control code associated with operation of appliance 110, and the controller is not restricted necessarily to a single element. The memory may represent random access memory such as DRAM, or read only memory such as ROM, electrically erasable, programmable read only memory (EEPROM), or FLASH. In one example embodiment, the processor executes programming instructions stored in memory. The memory may be a separate component from the processor or may be included onboard within the processor. Alternatively, the controller may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Leak detection system 100 also includes a leak detector 120. Leak detector 120 may be used to monitor a variety of appliances (identified generally by reference numeral 110), as described in further detail below. In general, leak detector 120 may be a standalone device that is positioned proximate or mounted on appliance 110 in order to monitor for leaks within or near appliance 110. According to example embodiments, leak detector 120 may be battery-operated or may be plugged into a conventional wall outlet. In addition, leak detector 120 may include button(s) or other user interfaces (not labeled) that receive user inputs, permit the activation of various methods or modules, etc. Leak detector 120 may further include an indicator (not labeled) for providing user feedback. The methods, notifications, and operations described herein may be configured by the user in any suitable manner. For example, notifications may be enabled and disabled using the push button on leak detector 120 or through a smart home assistant device or other remote devices, such as phone, tablet, personal computer, etc. These notifications may be fully configurable by a user.

As shown, leak detector 120 may be in operative communication directly or indirectly with a remote or external computing device 130. Moreover, remote device 130, such as a smartphone, tablet, personal computer, etc., may be in operative communication with leak detector 120 through a network WC. Specifically, according to an example embodiment, network WC is configured for signal communication between appliance 110, leak detector 120, a user via remote device 130, and/or a remote server 140. According to example embodiments, leak detector 120 may communicate with remote device 130 either directly (e.g., through a local area network (LAN), Wi-Fi, Bluetooth®, etc.) or indirectly (e.g., via a mesh network), as well as with remote server 140, e.g., through a router 150, to receive notifications, provide confirmations, input operational data, transmit sound signals and sound signatures, etc., on network WC.

In general, remote device 130 may be any suitable device for providing and/or receiving communications or commands from a user. In this regard, remote device 130 may include, for example, a personal phone, a tablet, a laptop computer, a smart home assistant (e.g., Google® Assistant or Amazon® Alexa), or another mobile device. In addition, or alternatively, communication between appliance 110 and the user may be achieved directly through the control panel on appliance 110. In general, network WC can be any type of communication network. For example, network WC can include one or more of a wireless network, a wired network, a personal area network, a local area network, a wide area network, the internet, a cellular network, etc. In general, communication with network may use any of a variety of communication protocols (e.g., TCP/IP, HTTP, SMTP, FTP), encodings or formats (e.g. HTML, XML), and/or protection schemes (e.g., VPN, secure HTTP, SSL).

Leak detector 120 may include any suitable type of sensor for detecting water leaks from or proximate appliance 110. For instance, leak detector 120 may include an optical sensor, a relay contact probe, etc. As shown in FIG. 1, leak detector 120 may also include a microphone 122 that is used for monitoring sound waves, noises, or other vibrations generated during the operation of appliance 110 (or any other appliance) within audible range of microphone 122. For example, microphone 122 may be one or more microphones, acoustic detection devices, vibration sensors, or any other suitable acoustic transducers that are positioned at one or more locations in or around leak detector 120. Leak detector 120 may further include a controller, e.g., configured in the same or similar manner to that described above for appliance 110. In general, the controller of leak detector 120 may be communicatively coupled with microphone 122 for receiving sound signals. In certain example embodiments, the controller of leak detector 120 may transmit data corresponding to the sound signal(s) to another computing device, such as remote device 130 and/or remote server 140. In certain example embodiments, the controller of leak detector 120 may be configured for analyzing sound signals from microphone 122 to identify sound signatures, as discussed in greater detail below.

It should be appreciated that some or all of the sound processing and signature detection described herein may be performed locally, remotely, or in any other distributed manner by system 100. In this regard, for example, remote device 130 and/or remote server 140 may include a sound processing module or application module that is configured for receiving sound signals from microphone 122 via network WC and analyzing the sound signals to identify sound signatures. Remote device 130 and/or remote server 140 may further be configured to communicate with a database with reference sound signatures for comparing with detected sound signatures. In this manner, remote device 130 may associate a given sound signature with a corresponding type of appliance. In certain example embodiments, processing and/or comparing of audio signals may be performed on a group of servers (e.g., the "cloud").

Notably, sounds generated during operation of appliance 110 may be associated with the particular type of appliance 110, e.g., the washing machine shown in FIG. 1. Washing machine appliances may have unique operating sounds comparted to other types of appliances, such as dishwasher appliances, water heater appliances, refrigerator appliances, etc. Moreover, a fill cycle, spin cycle, agitation cycle, etc. of washing machine appliances may be unique relative to other types of appliances. As another example, the controller of appliance 110 may be programmed to generate a particular sequence, tone, or frequency of sounds during an association process. These sounds may be unique and identifiable, for example, by natural resonant frequencies, amplitudes, the time-based excitations, the excitation rate (e.g., the speed at which a particular sound is triggered), the time decay of the generated sound waves, or any other acoustic signature or characteristic. Thus, the sounds emitted by appliance 110 during operation or during an association process may be unique to the type of appliance 110 as compared to other types of appliances.

Other types of appliances (e.g., different than the type of appliance 110) may make other sounds that are also detectable or recognizable by leak detector 120. Leak detector 120 may be configured to be placed next to any such appliances and listening for such sounds with microphone 122. For example, a refrigerator appliance may make a specific noise during operation of the compressor, ice dispensing, etc. Leak detector 120 may be programmed for listening to these specific noises, as well as various other sounds generated by various other appliances, via microphone 122.

While not shown in FIG. 1, leak detection system 100 may also include a mains-powered gateway or hub in certain example embodiments. The gateway may be configured for collecting data from leak detector(s) 120 and/or for forwarding the data from leak detector(s) 120, e.g., to the cloud, via a wireless (e.g. WiFi) connection. This gateway may be part of a wireless mesh connection between that include leak detector(s) 120.

Figure 2:
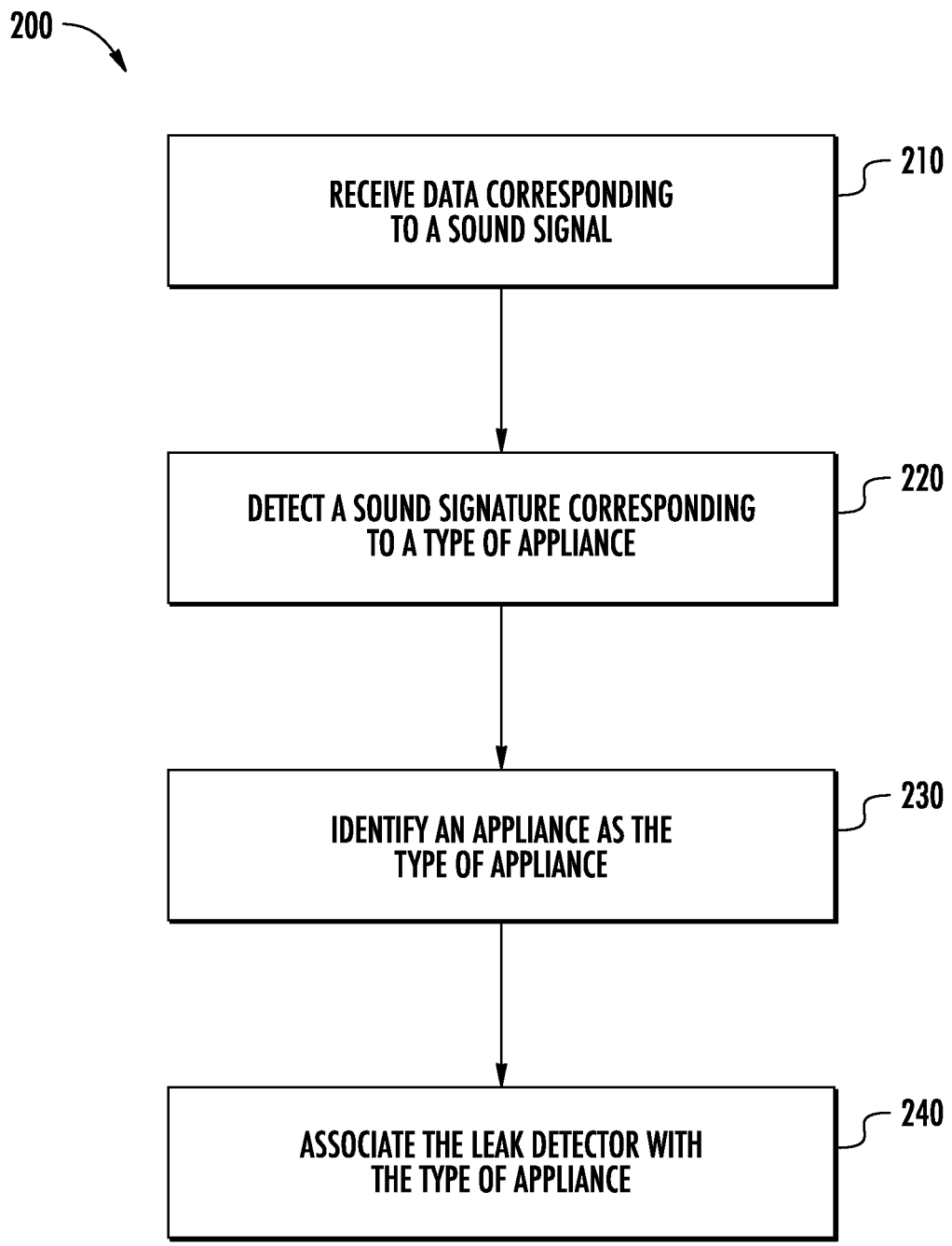
FIG. 2 illustrates a method for associating a leak detector with an appliance according to an example embodiment of the present subject matter.

FIG. 2 illustrates an example method 200 for associating a leak detector with an appliance according to an example embodiment of the present subject matter. As an example, method 200 may be used in or with leak detection system 100 to assist with associating leak detector 120 with appliance 110, e.g., with the type of appliance 110. The controller of leak detector 120 and appliance 110 may be programmed or configured to implement at least a portion of method 200. Remote device 130 and remote server(s) 140 may also be programmed or configured to implement at least a portion of method 200. While method 200 is described in greater detail below in the context of leak detection system 100, it will be understood that method 200 may be used in or within any suitable leak detector in alternative example embodiments.

At 210, data from leak detector 120 may be received at a computing system that includes one or more computing devices via network WC. For example, leak detector 120 may transmit the data to one or both of remote device 130 and remote server 140 at 210. The data from leak detector 120 may corresponding to a sound signal generated by appliance 110 received at microphone 122 of leak detector 120. For instance, leak detector 120 may be positioned proximate appliance 110, and appliance 110 may emit sound during operation of appliance 110. Microphone 122 of leak detector 120 may record the sound from appliance 110, and the sound signal generated by appliance 110 may be unique relative to other types of appliances. For instance, when appliance 110 is a washing machine appliance, appliance 110 may emit unique sounds during operation relative to other types of appliance, such as dishwasher appliances, water heater appliances, refrigerator appliances, etc. As another example, appliance 110 may be configured to emit a sound, such as a tune, beep, buzz, etc., which is unique to the type of appliance 110, during an association process. As may be seen from the above, microphone 122 may record sound(s) from appliance 110 at 210.

At 220, a sound signature of appliance 110 may be detected based at least in part on the sound signal from 210. For instance, remote device 130 and/or remote server 140 may analyze the sound signal from leak detector 120 at 220 in order to detect the sound signature of appliance 110. In certain example embodiments, a group of servers (e.g., the "cloud") may analyze the sound signal from leak detector 120 at 220 in order to detect the sound signature of appliance 110. The sound signature of appliance 110 may correspond to one of a plurality of appliance types. The plurality of appliance types may include two or more of a dishwasher appliance, a refrigerator appliance, a washing machine appliance, an ice maker appliance, and a water heater appliance.

At 230, appliance 110 may be identified as the one of the plurality of appliance types. For instance, when the sound signature at 220 corresponds to washing machine appliance, appliance 110 may be identified as the washing machine appliance at 230. Accordingly, remote device 130 and/or remote server 140 may identify appliance 110 as the one of the plurality of appliance types to which the sound signature of appliance 110 corresponds. In certain example embodiments, a group of servers (e.g., the "cloud") may identify appliance 110 as the one of the plurality of appliance types to which the sound signature of appliance 110 corresponds.

It should be appreciated that the term "sound signature" may generally refer to any detectable sounds having any suitable amplitude, frequency, tone, pattern, etc. Each sound signature may be associated with a respective one of the plurality of appliance types. Any suitable sound recognition process or tool may be used to identify noise sources and operating conditions of appliance 110. For example, the sound recognition processes may rely on artificial intelligence, neural networks, machine learning, deep learning, or any other suitable sound processing and recognition techniques while remaining within the scope of the present subject matter. In addition, it should be appreciated that the sound signal and/or sound signature may be converted into any suitable form, may be compressed, may be transmitted, and may otherwise be manipulated in any suitable manner to improve analysis.

At 230, the sound signature of appliance 110 from 220 may be compared to a plurality of reference sound signatures for the plurality of appliance types. Each of the plurality of reference sound signatures may correspond to a respective one of the plurality of appliance types. For instance, the artificial intelligence, neural networks, machine learning, deep learning, or model may be trained on the plurality of reference sound signatures for the plurality of appliance types and used to identify the type of appliance 110 at 230.

At 240, leak detector 120 may be associated with the type of appliance identified at 230. For instance, remote device 130 and/or remote server 140 may associate leak detector with the type of appliance identified at 230. In certain example embodiments, a group of servers (e.g., the "cloud") may associate leak detector with the type of appliance identified at 230. Accordingly, e.g., after 240, leak detector 120 may be associated with a washing machine appliance, such that when leak detector 120 detects water and/or liquid, an alert may notify a user of leak detector 120 that the washing machine is potentially leaking. Moreover, method 200 may also include receiving data corresponding to a leak detection alert from leak detector 120 via network WC. For instance, remote device 130 and/or remote server 140 may receive the leak detection alert from leak detector 120 in response to leak detector 120 detecting water and/or liquid. Remote device 130 and/or remote server 140 may transmit or present the alert to the user along with the identification of appliance 110 proximate leak detector 120. Thus, the user may advantageously be informed of the type of appliance 110 to assist the user with locating the potential leak. In a residence with multiple leak detectors 120, such identification may assist the user with quickly locating the triggered leak detector 120 among the plurality of appliance types presented within the residence.

Method 200 may also include transmitting data corresponding to a deactivation command to appliance 110 via network WC in response to the leak detection alert. For example, remote device 130 and/or remote server 140 may transmit the deactivation command to appliance 110 via network WC, and appliance 110 may deactivate in response to the deactivation command.

FIG. 2 depicts steps performed in a particular order for purposes of illustration and discussion. Those of ordinary skill in the art, using the disclosures provided herein, will understand that the steps of any of the methods discussed herein may be adapted, rearranged, expanded, omitted, or modified in various ways without deviating from the scope of the present disclosure.

The present subject matter may assist with automatically associating a stand-alone water leak sensor to an appliance (e.g., a washing machine appliance, a dishwasher appliance, a water heater appliance, a refrigerator appliance, an ice maker appliance, etc.) that is located proximate the leak sensor through audio recognition and machine learning. The leak sensor may collect audio data emitted by the appliance and forwards the audio data to a computing device, e.g., an app running on the computing device, for audio signal processing and to run machine learning algorithms to instantly or gradually detect the appliance type that the leak detector is located nearby. Moreover, the leak sensor can collect audio data from the appliance via a microphone, e.g. the sound of a washer running in a certain cycle vs. the sound of a dishwasher running a certain cycle, etc., and forwards the audio data to the computing device connected to the leak detector via a wireless network. The computing device may runs audio processing software and/or machine learning algorithms to determine the type of appliance that the leak detector is located nearby and as a result, associates/links the leak sensor to the appliance. The computing device may also inform the cloud of the sensor-to-appliance association for the cloud to run a rules engine in which the cloud sends a message to the appliance when the associated leak sensor reports a leak.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for associating a leak detector with an appliance, comprising:
   a leak detector with a microphone configured for monitoring sound generated during operation of an appliance;
   a computing device in signal communication with the leak detector, the computing device configured for
      receiving, via a wireless network with the leak detector, data corresponding to a sound signal generated by the appliance;
      detecting a sound signature of the appliance based at least in part on the sound signal, the sound signature corresponding to one of a plurality of appliance types;
      identifying the appliance as the one of the plurality of appliance types; and
      associating the leak detector with the one of the plurality of appliance types.

2. The system of claim 1, wherein the sound signal generated by the appliance corresponds to noise emitted by the appliance during operation of the appliance.

3. The system of claim 1, wherein the computing device is further configured for transmitting data corresponding to the association of the leak detector with the one of the plurality of appliance types to a remote server.

4. The system of claim 1, wherein the leak detector is further configured for transmitting data corresponding to a leak detection alert in response to the microphone receiving a leak sound signal generated by the appliance.

5. The system of claim 4, wherein the appliance is deactivatable in response to receiving the data corresponding to the leak detection alert.

6. The system of claim 1, wherein the computing device is configured for identifying the appliance as the one of the plurality of appliance types by comparing the sound signature of the appliance to a plurality of reference sound signatures for the plurality of appliance types.

7. The system of claim 1, wherein the computing device comprises one of a tablet, a smartphone, and a personal computer.

8. The system of claim 1, wherein the plurality of appliance types comprises two or more of a dishwasher appliance, a refrigerator appliance, a washing machine appliance, an ice maker appliance, and a water heater appliance.

9. A method for associating a leak detector with an appliance, comprising:
    receiving data from a leak detector at a computing system that includes one or more computing devices via a wireless network, the data from the leak detector corresponding to a sound signal generated by an appliance received at a microphone of the leak detector;
    detecting, with the computing system, a sound signature of the appliance based at least in part on the sound signal, the sound signature corresponding to one of a plurality of appliance types;
    identifying, with the computing system, the appliance as the one of the plurality of appliance types; and
    associating, with the computing system, the leak detector with the one of the plurality of appliance types.

10. The method of claim 9, wherein the sound signal generated by the appliance corresponds to noise emitted by the appliance during operation of the appliance.

11. The method of claim 9, further comprising receiving, at the computing system, data corresponding to a leak detection alert from the leak detector via the wireless network.

12. The method of claim 11, further comprising transmitting, from the computing system, data corresponding to a deactivation command to the appliance via the wireless network in response to the leak detection alert.

13. The method of claim 9, wherein identifying the appliance as the one of the plurality of appliance types comprises comparing the sound signature of the appliance to a plurality of reference sound signatures for the plurality of appliance types.

14. The method of claim 9, wherein the one or more computing devices comprises a tablet, a smartphone, or a personal computer.

15. The method of claim 9, wherein the plurality of appliance types comprises two or more of a dishwasher appliance, a refrigerator appliance, a washing machine appliance, an ice maker appliance, and a water heater appliance.

* * * * *